United States Patent [19]
Scrivano

[11] Patent Number: 5,187,026
[45] Date of Patent: Feb. 16, 1993

[54] BATTERY ADAPTER

[76] Inventor: Thomas J. Scrivano, 976 Mission Dr., #4, Costa Mesa, Calif. 92626-4228

[21] Appl. No.: 594,552

[22] Filed: Oct. 9, 1990

[51] Int. Cl.$^5$ ............................................ H01M 2/10
[52] U.S. Cl. .................................. 429/96; 429/100
[58] Field of Search .................................. 429/96, 100

[56] References Cited

U.S. PATENT DOCUMENTS

| | | | |
|---|---|---|---|
| 3,301,712 | 1/1964 | Bach | 429/100 |
| 3,880,673 | 4/1975 | Buhrer | 136/173 |
| 3,990,919 | 11/1976 | Krueger | 429/100 |
| 3,998,516 | 12/1976 | Mabuchi | 339/153 |
| 4,352,052 | 9/1982 | Opper | 320/2 |
| 4,397,920 | 8/1983 | Trattner | 429/100 |
| 4,767,358 | 8/1988 | Nullmeyer et al. | 439/500 |
| 4,873,160 | 10/1989 | Miyazaki et al. | 429/170 |
| 4,992,987 | 2/1991 | Echols et al. | 365/229 |

Primary Examiner—Mark L. Bell
Assistant Examiner—A. Wright
Attorney, Agent, or Firm—Roy A. Ekstrand

[57] ABSTRACT

A battery adapter provides a housing having an outer shape corresponding to a pair of juxtaposed standard cylindrical type battery cells. A pair of electrical contacts are supported upon the housing to provide electrical connection to environments which would normally receive a pair of standard cylindrical type cells or combinations thereof. A long life battery having a voltage approximately double that of a standard one and a half volt battery is supported within the housing and electrical connections are provided between the terminals of the internal battery and the external terminals supported on the housing. Embodiments are shown in which the internal battery may be replaced. Embodiments which replicate either parallelly arranged or serially arranged cell combinations are shown.

13 Claims, 2 Drawing Sheets

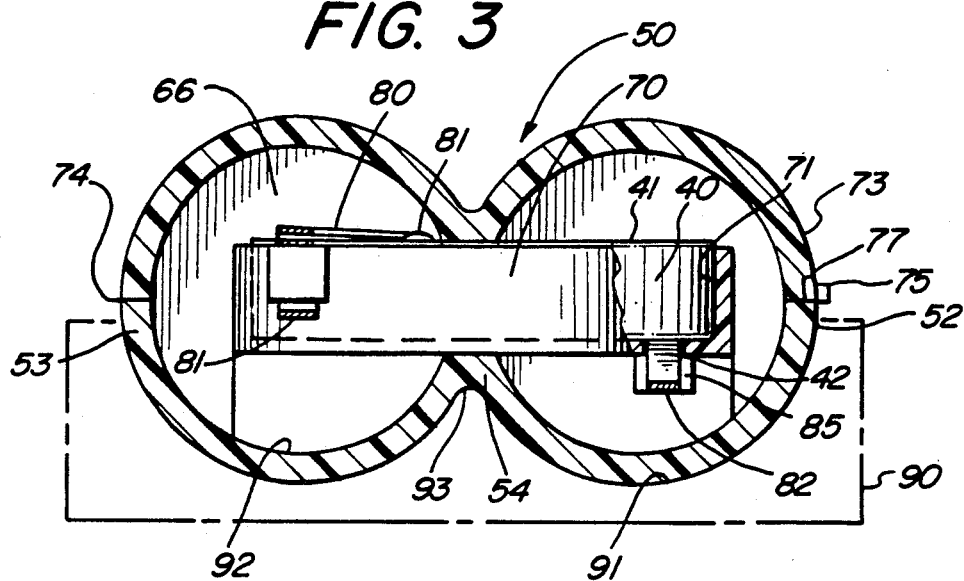
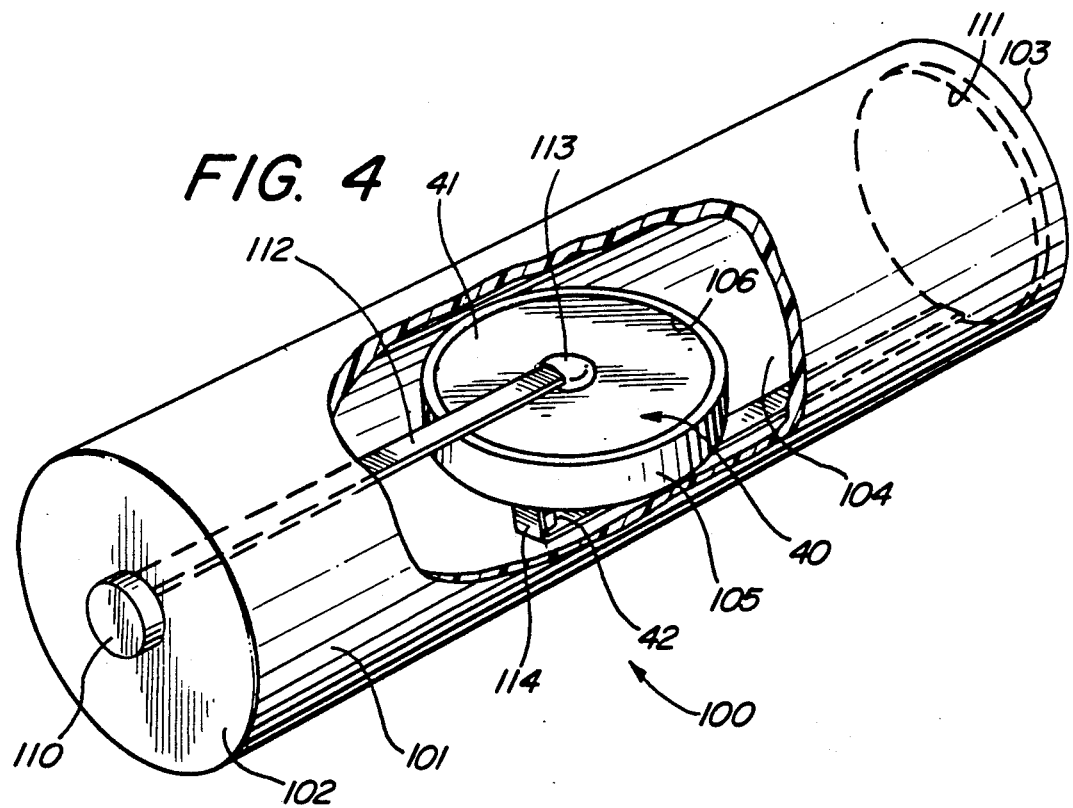

BATTERY ADAPTER

FIELD OF THE INVENTION

This invention relates generally to batteries and particularly to those used in a low power long life environment.

BACKGROUND OF THE INVENTION

Through the years the majority of batteries used to provide a mobile source of electrical DC power for the virtually endless array of battery powered devices have resulted in the proliferation of batteries in certain standard size units. The most common types of commercially available batteries are those generally designated as A, AA, AAA, C, and D cells. Such standard battery cells are usually alkaline electrochemical sources or the like and produce a electrical voltage of approximately 1.5 volts per cell. In their commercially available form, such standard cells comprise a generally cylindrical elongated housing having an extending positive terminal at one end and a generally flat metallic negative terminal at the other end. To provide the variety of operating voltages for units using such basic standard cells, manufacturers typically provide battery compartments or receptors which support multiple groups of standard cells in either series or parallel configuration.

The general operating environment for such standard battery cells may, to some extent, be divided between high power uses and low power uses. High power uses are characterized by the need to run high current apparatus such as electrical motors, heating elements and the like. Conversely, low power uses are typically found in computer type devices such as calculators, remote control units used for televisions and VCR's, smoke detectors and back-up systems or computer memories. While alkaline cells have proved satisfactory for the high power environment, they have been found less than desirable in the low power environment in that their useful life is limited. The typical alkaline cell has a life expectancy in low power or shelf life conditions of approximately one or two years at best.

A number of devices for supporting and combining such basic alkaline type cells have been provided by practitioners in the art to meet the varying needs of users. For example, U.S. Pat. No. 4,731,306 issued to Dumbser for a BATTERY ARRANGEMENT sets forth a battery arrangement used with distance and speed measuring indicators for cycles. The battery arrangement supports two batteries within a battery chamber having appropriate connections. The connections provide for battery replacement without interrupting the supply of electrical power during the battery replacement process.

U.S. Pat. No. 4,718,742 issued to Utoh, et al. sets forth a BATTERY FITTING DEVICE USABLE FOR ELECTRONIC APPLIANCE in which a battery holder is adapted to accommodate a button shaped battery which is then insertable into a holder accommodating cavity within the appliance. The battery is firmly clamped between contact leaf springs disposed in the battery accommodating cavity.

U.S. Pat. No. 2,522,660 issued to Bledsoe, Jr. sets forth a FOLDABLE HOLDER FOR FLASHLIGHT ELEMENTS in which an elongated generally planar support is formed of a foldable planar material such as rigid cardboard or the like. The folder includes spaced fold lines and interlocking tabs to provide a battery supporting cavity and means for supporting a light bulb. Electrical connections are made to complete a circuit between the battery and light bulb.

U.S. Pat. No. 4,223,076 issued to Terada sets forth a BATTERY CASING which comprises a lid closing a battery receiving chamber. The lid is directly mounted on the battery casing body thereby avoiding the use of the outer panel of the instrument which receives the battery. Electrical connections are provided to couple the appliance to the battery.

U.S. Pat. No. 4,842,966 issued to Omori, et al. sets forth a BATTERY HOLDER MECHANISM for holding a battery in an electronic device. The battery holder has a circular arc portion extending along the circumferential direction of the battery. First and second supporting projections extend from the inner peripheral edges of the circular arc portion and support the battery from both sides. Engagement pawls resiliently lock the battery holder body within the battery receiving hole. The battery is held by projections from both sides to restrict vertical displacement of the battery.

While the foregoing described battery holding apparatus provide some benefit in certain uses, there remains a need in the art for a more convenient way of supplying long lasting battery power to environments of low power use.

SUMMARY OF THE INVENTION

Accordingly, it is a general object of the present invention to provide an improved device for supplying electrical power to low power long life environments. It is a more particular object of the present invention to provide an effective alternative to conventional alkaline power cells in such low power long life environments.

In accordance with the present invention, there is provided a battery adapter comprises: a housing formed to define an outer surface corresponding generally to a pair of standard cylindrical batteries and defining opposed end portions; a battery having a positive terminal and a negative terminal and means for establishing an electrical potential therebetween approximately double that of a standard cylindrical battery; a positive contact and a negative contact supported upon the end portions of the housing at positions corresponding to the positions of one positive and one negative contact terminal of a pair of standard cylindrical batteries; and means providing electrical connection between the positive contact and the positive terminal and between the negative contact and the negative terminal.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 sets forth a section view of the present invention battery adapter taken along section lines 3—3 in FIG. 2; and FIG. 4 sets forth a perspective view of a still further alternate embodiment of the present invention battery adapter.

DESCRIPTION OF THE PREFERRED EMBODIMENTS

Figure 1:
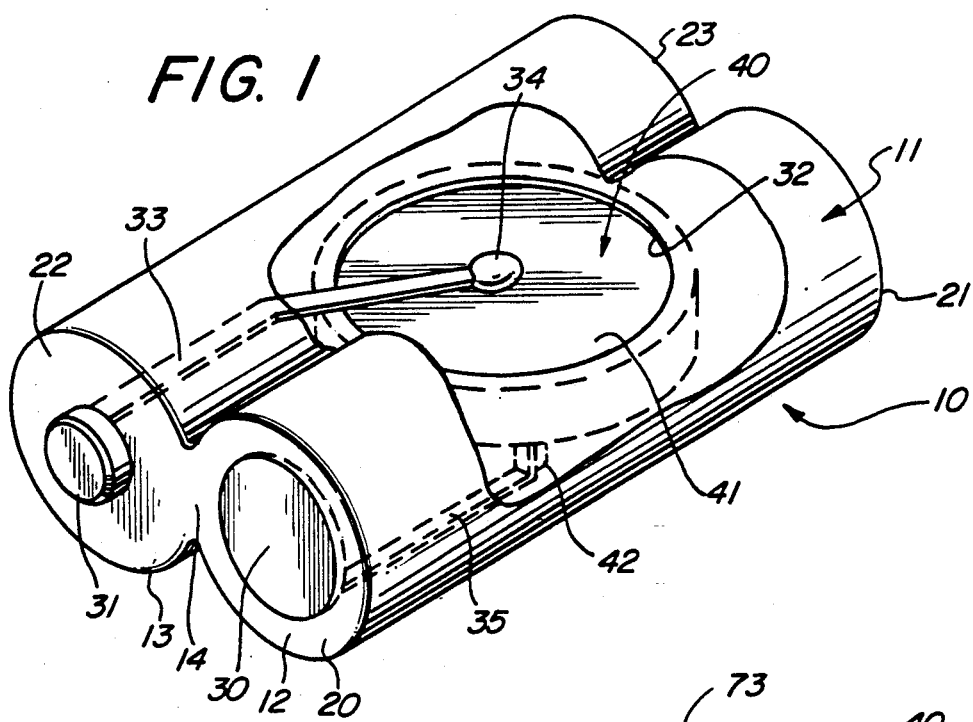
FIG. 1 sets forth a partially sectioned perspective view of a battery adapter constructed in accordance with the present invention.

FIG. 1 sets forth a perspective view of a battery adapter constructed in accordance with the present invention and generally referenced by numeral 10. Battery adapter 10 includes a housing 11 comprising a pair of cylindrical portions 12 and 13 joined by a joining portion 14. Cylindrical portion 12 defines a flat end 20 and a flat end 22 on opposed ends of cylindrical portion 12. Similarly, cylindrical portion 13 defines flat end portions 22 and 23 at opposite ends thereof. Joining portion 14 is generally co-extensive with cylindrical portions 12 and 13.

A negative electrical terminal 30 formed to correspond to the negative terminal of a standard alkaline type battery cell is supported by end portion 20 of cylindrical portion 12. A generally cylindrical outwardly extending positive electrical terminal contact 31 which is configured in correspondence to the typical positive contact of a standard alkaline type cell is supported by and extends outwardly from end portion 22 of cylindrical portion 13.

Housing 11 further defines a generally cylindrical recess 32 which is adapted to receive a lithium type battery 40. A battery 40 which comprises a disk-shaped battery such as a lithium three-volt battery defines a generally planar positive terminal 41 on one side and a downwardly extending negative terminal 42 on its underside. In accordance with the invention, battery 40 is received within recess 32 of housing 11 and is supported therein. In further accordance with the present invention, an electrical connector 33 extends within housing 11 from positive contact terminal 31 and defines a contact 34 at the opposite end thereof. Connector 33 further includes a contact 34 which in accordance with conventional fabrication techniques provides electrical connection between positive terminal 41 of battery 40 and positive contact terminal 31. A second connector 35 is coupled at one end to negative contact terminal 31 and extends within housing 11 to form electrical connection with negative terminal 42 of battery 40. In the embodiment shown in FIG. 1, housing 11 is formed of a suitable nonconductive material such as molded plastic or the like. In accordance with conventional fabrication techniques, battery 40, connector 33, connector 35 and contacts 31 and 30 may be preassembled and molded within housing 11 to form the structure shown in FIG. 1. It will be apparent to those skilled in the art that alternative molding and fabricating processes may be utilized to produce the structure shown in FIG. 1.

Battery adapter 10 forms a battery element which places a disk-shaped battery such as lithium battery 40 within a convenient housing replicating a pair of parallelly arranged standard cells such as the above-mentioned A, AA, AAA, C, and D. It will be apparent to those skilled in the art that while the embodiment of FIG. 1 replicates standard cells arranged in oppositely facing orientations, that the present invention may be equally well fabricated to replicate a pair of standard cells faced in common orientation by simply placing negative contact 30 on the opposite end of cylindrical portion 12. In any event, battery adapter 10 forms a convenient unit which may be readily substituted for a pair of conventional standard cells within the battery supporting environments of typical devices. In its most advantageous form, battery 40 comprises a three volt battery such as a lithium battery having a characteristic long life under low power uses. Such lithium batteries and other disk-shaped batteries have been conceived which exhibit low power lives in the order of five or ten years. Thus, it will be apparent to those skilled in the art that battery adapter 10 provides a superior source of electrical power in low power long life environments not realized by conventional alkaline type cells. It will be equally apparent to those skilled in the art that other long life battery cells may be substituted for the lithium cell used for battery 40 without departing from the spirit and scope of the present invention.

Figure 2:
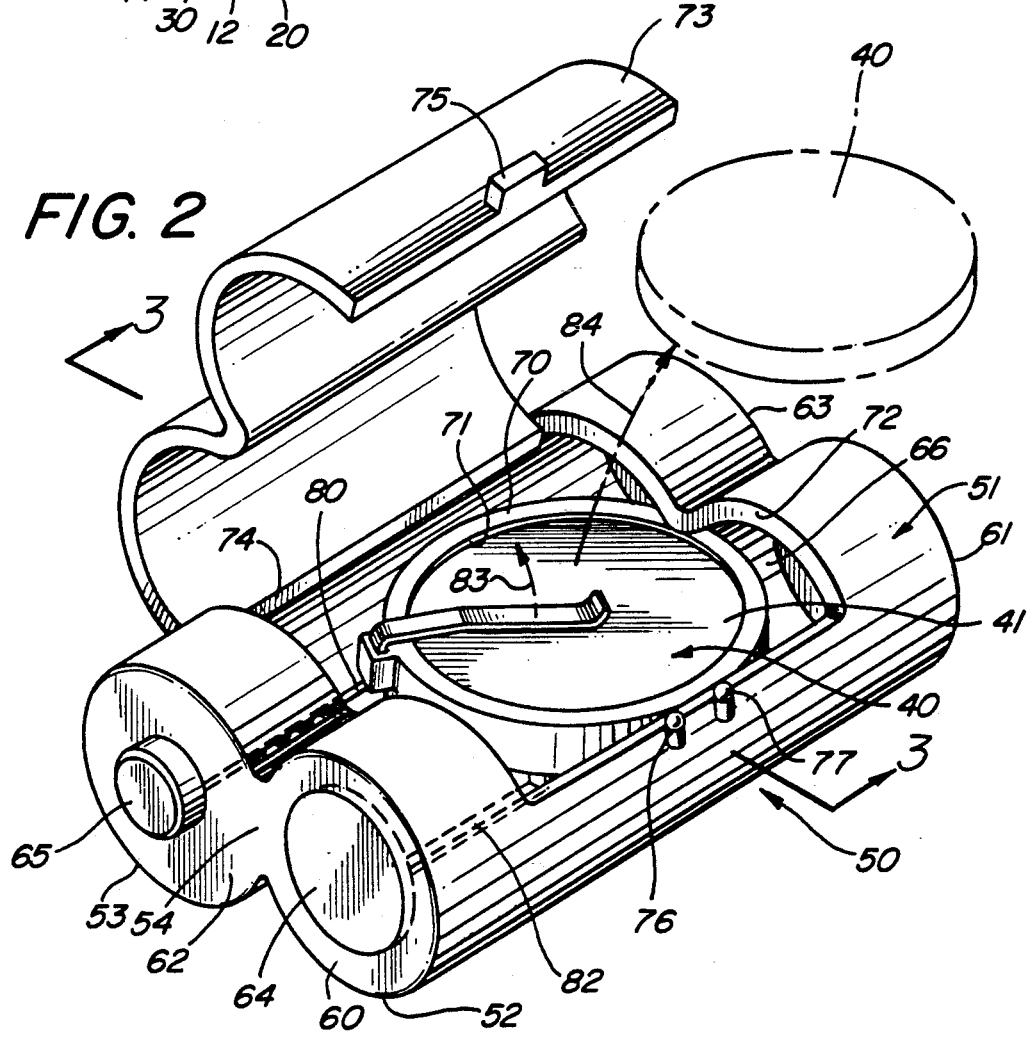
FIG. 2 sets forth a perspective view of an alternate embodiment of the present invention battery adapter.

FIG. 2 sets forth an alternate embodiment of the present invention battery adapter which permits replacement of the interior battery cell. A battery adapter 50 includes a housing 51 having a pair of parallel cylindrical portions 52 and 53. Cylindrical portions 52 and 53 are joined by a joining portion 54. Housing 51 further defines an interior cavity 66 and a door opening 72. A door 73 configured to correspond to the cylindrical juxtaposed surfaces of cylindrical portions 52 and 53 and joining portion 54 is pivotally secured to door opening 72 by a hinge 74. While a number of hinges may be used to pivotally support door 73, it has been found advantageous to use a thin plastic living hinge member which is integral with door 73. In alternative, it will be recognized at any number of interlocking hinges or attachments for pivotal attachment of door 73 to housing 51 may be used. Door 73 further defines a generally rectangular tab 75. Correspondingly, housing 51 defines a pair of spaced apart snap-lock posts 76 and 77. Posts 76 and 77 and tab 75 cooperate to provide a snap-lock attachment which maintains door 73 in a closed position within door opening 72.

A generally cylindrical battery support 70 is formed within interior cavity 66 of housing 51 and defines a cylindrical battery recess 71. A contact terminal 65 which replicates the positive terminal of a conventional alkaline type cell is supported upon end portion 62 of cylindrical portion 53. A connector 80 extends from terminal 65 inwardly and defines a contact 81 which is supported above battery recess 71. A contact terminal 64 which replicates the negative terminal of a conventional alkaline type cell is supported upon end portion 60 of cylindrical portion 52. A connector 82 extends inwardly from contact terminal 64 and terminates in an electrical connection 85 (seen in FIG. 3). A battery 40, which comprises in its preferred form a disk-shaped lithium battery, is received within battery recess 71 of battery support 70. In accordance with conventional fabrication techniques, lithium battery 40 includes a planar positive terminal 41 on its upper side and a downwardly extending negative terminal 42 (seen in FIG. 3).

In accordance with the present invention, connector 80 is pivoted in the direction indicated by arrow 83 to expose battery recess 71 in a sufficient manner to permit lithium battery 40 to be placed therein. Lithium battery 40 is placed within battery recess 71 such that negative terminal 42 is received by connector 85 (seen in FIG. 3). Thereafter, connector 80 is released and the spring force thereof urges contact 81 against positive terminal 41 to provide electrical connection between positive terminal 41 of battery 40 and positive contact terminal 65. With battery 40 thus installed, door 73 is pivoted about hinge 74 until tab 75 is received within and secured by snap-lock posts 76 and 77.

With battery 40 installed and door 73 closed, battery adapter 50 is ready to be placed within any operative environment which would normally receive a pair of standard cells in a parallel or side by side arrangement. Again, as described above in FIG. 1, the placement of positive contact terminal 65 and negative contact terminal 64 upon housing 51 may be varied to provide units which make electrical connection in a different manner than the side by side connection anticipated in FIGS. 1 and 2. When it is desired to replace battery 40, battery adapter 50 is removed from the host device and door 73 is opened to the position shown in FIG. 2. Thereafter, connector 80 is again pivoted away from positive terminal 41 and battery 40 is removed from recess 71 in the direction indicated by arrow 84. Thereafter, a replacement for battery 40 may be installed and door 73 closed once again.

FIG. 3 sets forth a section view of battery adapter 50 taken along section lines 3—3. Accordingly, battery adapter 50 defines cylindrical portions 52 and 53 joined by joining portion 54. Cylindrical portions 52 and 53 together with joining portion 54 form housing 51 which defines an interior cavity 66. A battery support 70 is formed within interior cavity 66 and defines a battery recess 71. Recess 71 supports connector 82 having an upwardly extending connection socket 85 coupled thereto. Connector 80 extends inwardly as seen in FIG. 2 and is supported upon battery support 70. Connector 80 terminates in a contact 81. A lithium type battery 40 having a downwardly extending negative terminal 42 and a planar positive terminal 41 is received within battery recess 71 such that negative terminal 42 is received within socket 85 and contact 81 forms electrical connection with terminal 41 thereof. Housing 51 defines a door portion 73 having an outwardly extending tab 75 and a hinge 74 pivotally securing door 73 to housing 51. Thus, in the position shown in FIG. 3, door 73 is closed and battery 40 is supported within battery support 70 to form the above-described structure shown in FIG. 2. For purposes of illustration, an exemplary battery case 90 is shown in dashed line outline to illustrate a typical battery receptacle of the type which receives a pair of standard alkaline type cells in parallel arrangement. Thus, battery case 90 provides a pair of parallel cylindrical cradle portions 91 and 92 and an upwardly extending intervening ridge portion 93. In accordance with an important aspect of the present invention, housing 51 is configured such that battery adapter 50 is easily received in battery case 90 in the same manner as a pair of parallelly arranged standard cells.

FIG. 4 sets forth a still further alternate embodiment of the present invention which may be substituted for a pair of standard cells arranged in an in-line series configuration. Thus, battery adapter 100 includes an elongated generally cylindrical housing 101 having planar end portions 102 and 103. End portion 102 supports a contact 110 configured to replicate the positive terminal of a standard alkaline type cell. A contact 111 is supported upon end 103 and is configured to replicate the negative terminal of a standard alkaline type cell. Housing 101 defines an interior 104 which includes a battery support 105 therein. Support 105 may be joined to housing 101 in accordance with conventional fabrication techniques and defines a generally cylindrical battery recess 106. Recess 106 receives a disk-shaped lithium type battery 40. Battery 40 includes a planar positive terminal 41 and a downwardly extending negative terminal 42. A connector 112 extends inwardly from contact 110 and terminates in a contact 113 which forms an electrical connection to positive terminal 41 of battery 40. A connector 114 extends inwardly from negative contact 111 and forms an electrical connection to negative terminal 42 in accordance with conventional fabrication techniques.

It will be apparent to those skilled in the art that while FIG. 4 sets forth an embodiment in which housing 101 defines an interior cavity, battery 40 may be supported within housing 101 in the manner described above for the embodiment of FIG. 1 in which battery 40 is molded into housing 101. Alternatively, a door similar to door 73 of the embodiment of FIG. 2 may be provided to permit access to battery 40 and replacement thereof. Battery adapter 40 provides a source of electrical power which may be substituted for a pair of standard battery cells arranged in a series configuration. Thus, in its preferred form, battery adapter 100 defines a length approximately equal to the length of two standard alkaline type cells.

What has been shown is an economical, easy to utilize battery adapter which permits the replacement of a pair of standard cylindrical battery cells with a single integral unit having a long life type battery included therein. The invention permits the easy replacement of shorter life alkaline type batteries and the like with a longer life source of electrical power.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A battery adapter comprising:
   a housing formed to define an outer surface corresponding generally to a pair of cylindrical batteries and defining elongated major axes and opposed end portions;
   a generally disk-shaped battery having a positive terminal and a negative terminal and means for establishing an electrical potential therebetween approximately double that of a cylindrical battery;
   a positive contact and a negative contact supported upon said end portions of said housing at positions corresponding to the positions of one positive and one negative contact terminal of a pair of cylindrical batteries; and
   means providing electrical connection between said positive contact and said positive terminal and between said negative contact and said negative terminal.

2. A battery adapter as set forth claim 1 wherein said outer surface of said housing corresponds generally to a pair of cylindrical batteries arranged in a side by side arrangement.

3. A battery adapter as set forth in claim 2 wherein said positive and negative contacts are positioned on the same one of said opposed end portions in a spaced-apart relationship corresponding to that of a side by side arrangement of cylindrical batteries.

4. A battery adapter as set forth in claim 3 wherein said housing defines an interior cavity and a battery recess therein and a door portion movable between a closed position and an open position in which said battery recess is exposed.

5. A battery adapter as set forth in claim 4 wherein said battery is removable from said battery recess.

6. A battery adapter as set forth in claim 5 wherein said battery is a lithium battery.

7. A battery adapter as set forth in claim 1 wherein said outer surface of said housing corresponds generally to a pair of cylindrical batteries arranged in a coaxial series arrangement.

8. A battery adapter as set forth in claim 7 wherein said positive and negative contacts are positioned on the opposite ones of said opposed end portions in a spaced-apart relationship corresponding to that of a series arrangement of standard cylindrical batteries.

9. A battery adapter as set forth in claim 8 wherein said housing defines an interior cavity and a battery recess therein and a door portion movable between a closed position and an open position in which said battery recess is exposed.

10. A battery adapter as set forth in claim 9 wherein said battery is removable from said battery recess.

11. A battery adapter as set forth in claim 10 wherein said battery is a lithium battery.

12. A battery adapter as set forth in claim 2 wherein said housing is formed of a molded plastic material and wherein said battery is molded into said housing.

13. In a battery operate device which receives and supports a pair of generally cylindrical batteries and having positive and negative connecting means for establishing positive and negative electrical connections thereto, a battery adapter comprising:

a housing shaped to generally replicate the pair of cylindrical batteries and having a positive and negative contact supported upon said housing so as to contact the positive and negative connecting means when said housing is received within the battery operated device in place of the pair of cylindrical batteries; and an internal battery having a generally disk-shaped body defining a pair of generally planar contact surfaces on opposed sides of said generally disk-shaped body and having a battery voltage substantially twice that of each of the cylindrical batteries supported within said housing and coupled to said positive and negative contacts.

* * * * *